United States Patent [19]
Abarbanel et al.

[11] Patent Number: 5,923,760
[45] Date of Patent: Jul. 13, 1999

[54] CHAOTIC COMMUNICATION APPARATUS AND METHOD FOR USE WITH A WIRED OR WIRELESS TRANSMISSION LINK

[75] Inventors: Henry D.I. Abarbanel, Del Mar; Nikolai F. Rulkov, San Diego; Lev Sh. Tsimring, San Diego; Mikhail I. Rabinovich, San Diego, all of Calif.

[73] Assignee: Applied Nonlinear Sciences, LLC, Del Mar, Calif.

[21] Appl. No.: 08/674,631

[22] Filed: Jul. 5, 1996

[51] Int. Cl.$^6$ ...................................................... H04C 9/00
[52] U.S. Cl. .............................................. 380/34; 380/48
[58] Field of Search .................................. 380/9, 28, 34, 380/48–50

[56] References Cited

U.S. PATENT DOCUMENTS

| | | | |
|---|---|---|---|
| 5,245,660 | 9/1993 | Pecora et al. | 380/48 |
| 5,291,555 | 3/1994 | Cuomo et al. | 380/34 |
| 5,379,346 | 1/1995 | Pecora et al. | 380/48 |
| 5,680,462 | 10/1997 | Miller et al. | 380/48 |

OTHER PUBLICATIONS

"Synchronous Chaotic Response of Nonlinear Oscillator System"... Jolkovski & Rulkov—Tech. Phys Letter—19(2) Feb. 1993.

"Chaotic Digital Encoding: An Approach to Secure Communication" D. R. Frey, IEEE Transactions vol. 40 No. 10 Oct. 1993.

"Using Filters for Chaotic Synchronization For Communications" T.L. Carroll—IEEE International Symposium 1995 Seattle Wash.

*Primary Examiner*—Salvatore Cangialosi
*Attorney, Agent, or Firm*—Daniel Robbins

[57] ABSTRACT

A covert communication apparatus exploits chaotic dynamics in the multi-dimensional phase space with a continuous number of states and wide internal spectral bandwidth. The information modulates a chaotically generated signal, and the modulated chaotic signal is shaped for compatibility with the specific constraints demanded by the communication channel. In an analog embodiment, the chaotic signal spectrum is band limited to be compatible with the bandwidth requirements of the transmission link, and in a digital embodiment the word length and baud rate of the transmitted digital data are selected for similar transmission link compatibility. After transmission over the communication link, the received signal is applied to a receiver chaotic signal generator substantially identical to the transmitter chaotic signal generator and the chaotic signal is recovered. This chaotic signal is used to demodulate the received signal for recovery of the information.

6 Claims, 5 Drawing Sheets

CHAOTIC COMMUNICATION APPARATUS AND METHOD FOR USE WITH A WIRED OR WIRELESS TRANSMISSION LINK

BACKGROUND OF THE INVENTION

1. Field of the Invention

This invention relates to signal transmission and reception using information modulation of a chaotic carrier, and in particular to secure communication using a modulated chaotic carrier transmitted over a conventional communication link.

2. Description Relative to the Prior Art

By modulating a chaotic carrier with an information signal whose frequency components lie within the same band as the components of the chaotic carrier, the chaotic nature of the resultant signal masks the presence of the information being transmitted. Analysis of the signal by conventional data evaluation means commonly used in the art, such as Fourier analysis, will neither lead to recovery of the information itself, nor provide confirmation that information is, in fact, being transmitted over the channel. Attendantly, communication over the chaotic channel is highly secure.

To provide such a secure channel, systems for the modulation of a chaotic carrier by an information signal have been disclosed in technical journal articles and in recently issued patents. Generally, the apparatus disclosed consists of a non-linear transmitter adjusted to generate chaotic oscillations which are characterized by local instability of its trajectories in the multi-dimensional phase space of the generator. This instability provides noise like oscillations which have a continuous, broad band frequency spectrum. The spectrum of the carrier can be controlled by variation of the parameters of the generator, and the modulation is effected by mixing the information signal with the chaotic signal of the generator.

At the receiving site, the modulated chaotic carrier is applied to the input of a receiver containing a circuit which replicates the circuit of the chaotic generator of the transmitter. The received modulated chaotic carrier forces the receiver circuit to oscillate with chaotic trajectories identical to those of the transmitting generator, locally reproducing a demodulating signal which is synchronous with the received carrier. The locally reproduced chaotic oscillation is then subtracted from the received modulated carrier to recover the original information signal.

Among prior art disclosures of interest are U.S. Pat. No. 5,291,555 issued to Cuomo et al, U.S. Pat. No. 5,379,346 issued to Pecora et al, and an article published in the journal "Technical Physics Letters", 19(2), February 1993 entitled "Synchronous Chaotic Response of a Nonlinear Oscillator System as a Principle for the Detection of the Information Component of Chaos" by A. R. Volkovskii and N. F. Rul'kov, which disclose various circuits that implement the above described technique. The modulation methods described in these references utilize conventional analog mixing of the chaotic carrier by the information signal, with correspondingly conventional demodulation. In these disclosures, in order to deter an eavesdropper a low amplitude information signal must be used, leading to a loss in signal to noise ratio and to a relative ease of breaking the secure communication, as is pointed out in the article "Steps Toward Unmasking Secure Communications", International Journal of Bifurcation and Chaos in Applied Science and Engineering, August 1994, 4(4).

The use of filters in chaotic systems which serve only to suppress large "spike" components at specific frequencies has been disclosed in U.S. Pat. No. 5,291,555 issued to Cuomo et al, mentioned above, and in the article "Using Filters for Chaotic Synchronization for Communications", by T. L. Carroll, IEEE International Symposium for Circuits and Systems, April 1995, Seattle, Wash.

A discussion of the digital implementation of chaotic covert communication is presented in an article "Chaotic Digital Encoding: an Approach to Secure Communication" by D. R. Frey IEEE Transactions on Circuits and Systems-II. Analog and Digital Signal Processing, 40(10) 1993. In Frey's paper, a chaotic modulator and demodulator implemented by means of a non-linear digital filter consisting of shift registers is disclosed.

It will be noted that the above prior art does not address the effect of the band limited characteristics of real world transmission links. The frequency bandwidth of available links typically lack low frequency response with an inability to transmit dc signals, and have a high frequency cutoff defining the upper end of the band. Resultantly, a transmission link has a band pass characterized by certain frequency and phase particularities, and these important real world characteristics are not addressed in the chaotic covert communication systems disclosed in the prior art. In the teaching of the present invention, transmission link bandwidth limitations are considered, and are dealt with in the overall design of the chaotic covert communication system.

SUMMARY OF THE INVENTION

Three preferred embodiments of the present invention are disclosed, and all are characterized by the following common teaching: they exploit chaotic dynamics in the multi-dimensional phase space with a continuous number of states and wide internal spectral bandwidth, but with the transmitted chaotic signal shaped for compatibility with the specific constraints demanded by the communication channel. In an analog embodiment, the chaotic signal spectrum is band limited to be compatible with the bandwidth requirements of the transmission link, and in a digital embodiment the word length and baud rate are selected for similar transmission link compatibility.

In a first embodiment of the invention where the information source is analog, an analog chaotic generator utilizes feedback incorporating a bandpass filter tailored so the chaotic output of the chaotic generator is compatible with the bandpass characteristics of the transmission link. The bandpass filter is so integrated into the chaotic generator that, upon transmission, the modulated chaotic generator output is not selectively attenuated or otherwise characteristically modified over the finite bandpass of the transmission link. Resultantly, after transmission over the communication link the receiver's chaotic demodulator, incorporating the same bandpass filter network as the transmitting chaotic generator, synchronizes with the received chaotic signal allowing demodulation and recovery of the information signal.

In a second embodiment of the invention, the information source is analog, and a first analog to digital converter is used at the transmitting location to convert the analog information into digital form. This digital data is then applied to one input of an "exclusive OR" circuit, whose output goes to the transmission link and also to a digital to analog converter. The analog output of the digital to analog converter is applied to an analog chaotic circuit of the first preferred embodiment above, or to one of other known analog chaotic circuits, and the analog output of the chaotic circuit is applied to a second analog to digital converter. The analog chaotic circuit is a non-linear circuit compatible with the modulator in the practice of communication using chaotic dynamics. The digital output of the second analog to digital converter is applied to the second input of the "exclusive OR" circuit.

The receiver structure mirrors that of the above described transmitter. The received digital signal is converted to an analog signal which is applied to the analog circuit identical to the analog chaotic circuit, whose output is again converted to a digital representation, and applied to an "exclusive OR" circuit whose other input is the digital signal from the transmission link. The digital output of the "exclusive OR", which is the message signal digitally encoded, is applied to an analog to digital converter whose output is the original analog message signal.

In a third embodiment, a digital information sequence is chaotically modulated by means of a programmed digital computer. A binary information data stream is input to the digital computer as 32 bit (4 byte) words, and each word is initially mixed with the output of a computing circuit in an "exclusive OR" operation, as described below. The "mixed word" is then converted into a double precision numerical value. A chaotic converter is implemented to generate a chaotic map by multiplying the double precision mixed word value by a stored double precision multiplier, and taking the fractional part of the resultant double precision product. Before applying it to the "exclusive OR" circuit, this number is converted back into a 32 bit binary sequence by dropping the 32 least significant bits derived from the integer value of the product. During this time the next 32 bit information word is input to the computer where it is stored, and mixed by means of the "exclusive OR" operation with the output of the digital computation. The continuous repetitive flow of the above process provides a digital stream of chaotically masked information. The 32 bit output of the "exclusive OR" operation is also taken as the masked signal for secure transmission by means of a wired or wireless transmission link.

At the receiver end, the received data stream is input into a digital chaotic converter, consisting of digital computer programmed identically to the modulating digital computer. As in the transmitting case, the output stream of the computing circuit is mixed with the received bit stream by means of an "exclusive OR" operation, and the output of the "exclusive OR" operation is the original information. The resultant information bit stream exactly reproduces the original bit stream after synchronization has been established; this takes from about 100 bits depending on the specific implementation of the digital chaotic converter. As in the case of the encoding process, the initial state of the receiver map is irrelevant as the map is automatically synchronized in a few iterations.

It will be noted that in covert communication by means of the analog technique, the amplitude of the information signal relative to the carrier amplitude must be small enough to hide the presence of information in the transmitted signal. This method trades much of the dynamic range for security, and therefore becomes susceptible for contamination by noise. The above described digital embodiment is immune from this problem as the signal and the chaotic map are both always in digital form. Also, because of the digital implementation of the transmitted chaotic signal, the band pass characteristics of the transmission link do not effect the reliability of recovery of the encoded information as long as the digital characteristics of the encoded transmitted signal, i.e. pulse width and baud rate of the digital data, are matched to the transmission link bandpass in a manner known to those skilled in the art.

BRIEF DESCRIPTION OF THE DRAWINGS

The invention will be described in terms of the drawings of which.

DESCRIPTION OF THE PREFERRED EMBODIMENTS

Figure 1:
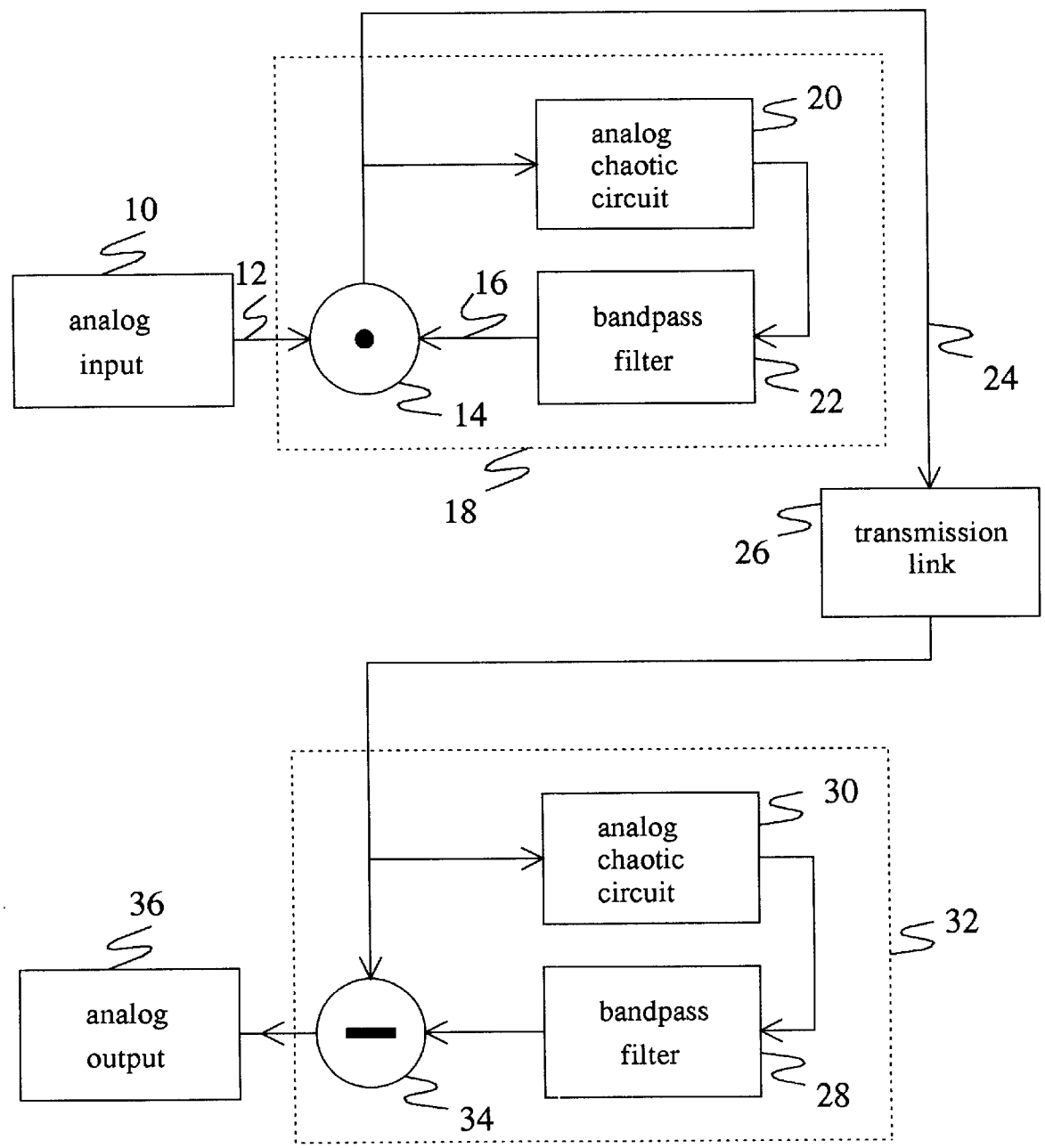
FIG. 1 is a block diagram of an analog embodiment of the invention.

Referring to FIG. 1, a first embodiment of the invention comprises an analog input 10 feeding an input signal 12 of a mixer 14 whose other input 16 is the signal from the band pass filter 22 of a chaotic generator 18 having an analog chaotic circuit 20 and an associated bandpass filter 22. The mixed signal 24 from the mixer 14 is the modulated output signal of the transmitter side of the invention, and is transmitted over a transmission link 26. The transmission link 26 is characterized by its bandpass response, and in the transmitter the bandpass filter 22, is positioned in a feedback path of the analog chaotic circuit 20, and is tailored so that the chaotic oscillations of the output of the transmitter chaotic generator 18 have the frequency characteristic which will fit into the bandwidth of the transmission link 26. In this way, the frequency spectrum of the modulated chaotic oscillations carried over the transmission link 26 will not be selectively attenuated by the bandpass of the transmission link 26.

The output 25 of the transmission link 26 feeds a mixing demodulator 34 in the receiver 32, and the output of the mixing demodulator 34 feeds an analog chaotic circuit 30. The other input of the mixing demodulator 34 is the output of a band pass filter 28. The feedback combination of the analog chaotic circuit 30 and bandpass filter 28 are identical to the corresponding elements 20,22 of the transmitting chaotic generator 18. The signal from the transmission link 26 synchronizes the chaotic oscillations generated by the analog chaotic circuit 30, and these oscillations are subtracted from the output 25 of the transmission link 26 by the mixing demodulator 34 to provide the analog output 36.

Figure 2:
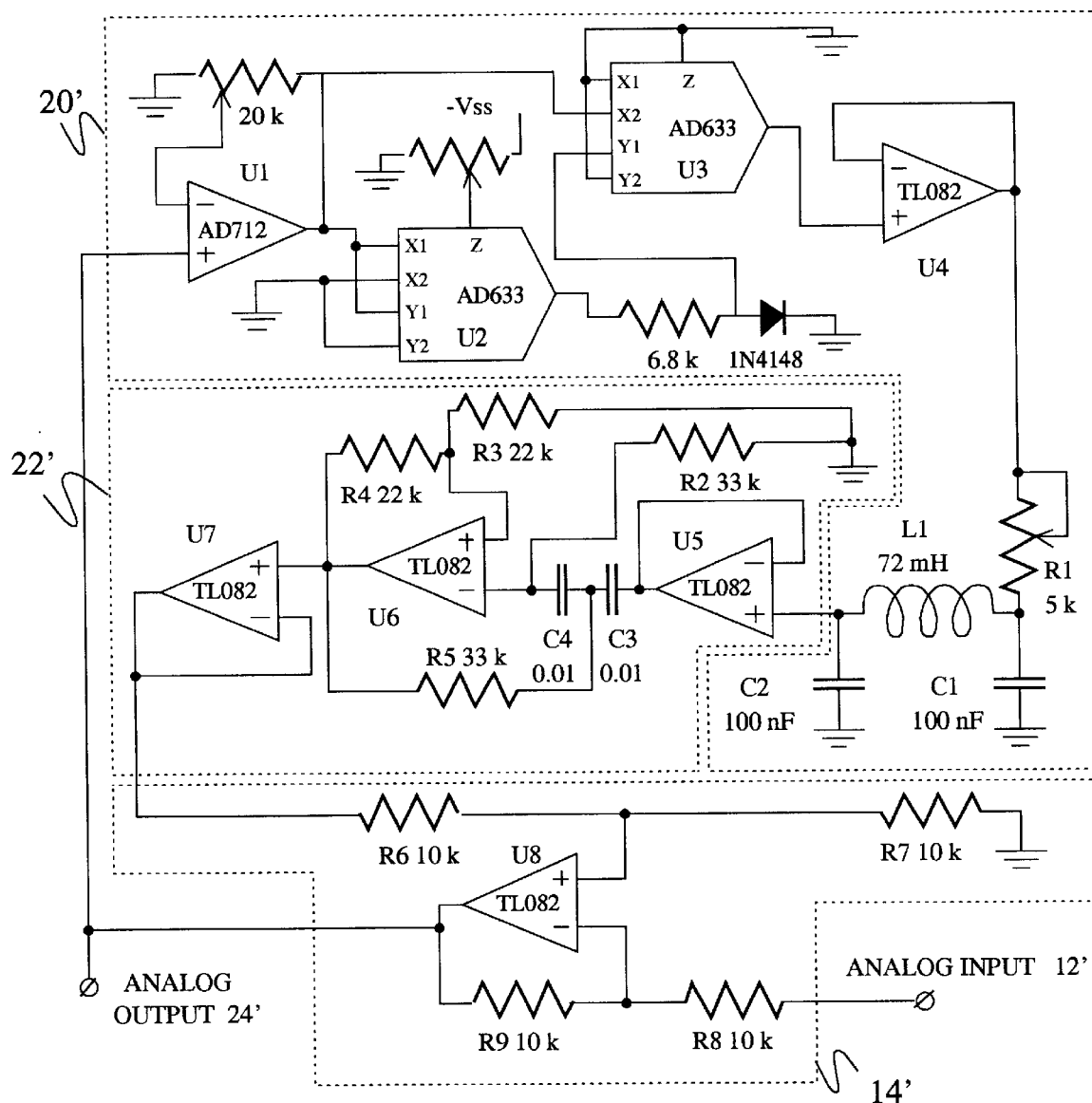
FIG. 2 is a circuit diagram of an implementation of the chaotic modulator of FIG. 1.
Figure 3:
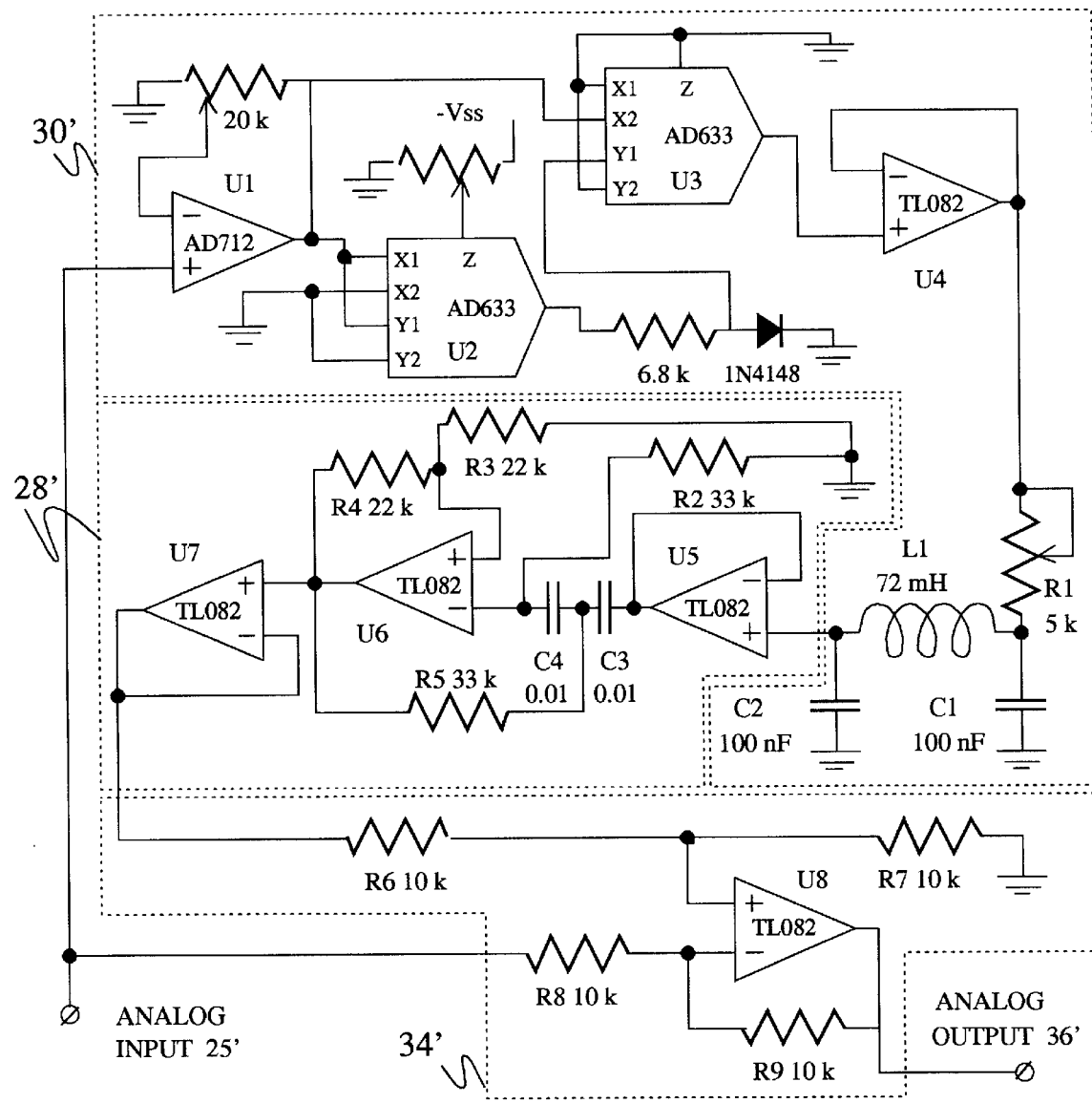
FIG. 3 is a circuit diagram of an implementation of the chaotic demodulator of FIG. 1.

In the interest of providing a full and complete disclosure of the invention, circuits with appropriate component values are presented in FIGS. 2,3. To facilitate understanding of the operation of the circuits of FIGS. 2,3, the corresponding parts of FIG. 1 have been appropriately blocked off and provided with the same character numbers, albeit that such numbers in FIGS. 2,3 have been primed. In the drawings the analog chaotic circuits 20', 30' are implemented with non-linear converters (U2,U3) and linear circuits (R1,C1,C2, L1). The linear circuits provide a multi-dimensional phase space and, at the same time function as band pass filter 22, 28.

Figure 4:
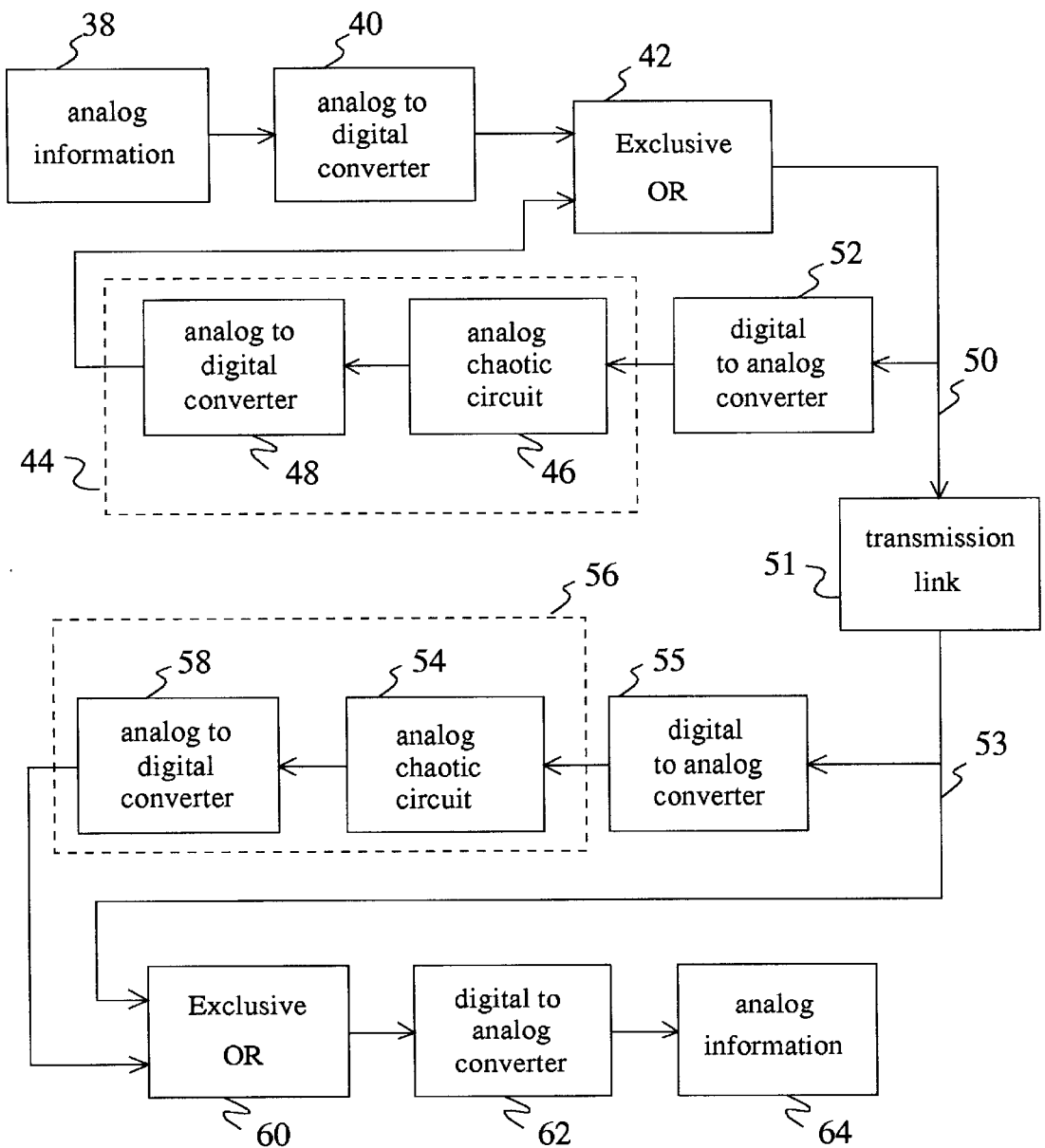
FIG. 4 is a block diagram of an analog embodiment of the invention adapted for communication in a digital form.

The second embodiment of the invention is illustrated in FIG. 4, where an analog information 38 is fed to an analog to digital converter 40. The stream of digital bits output by the analog to digital converter 40 is fed to one input of an "exclusive OR" circuit 42. The other input to the "exclusive OR" circuit 42 is fed from the digital output of a combined analog/digital chaotic generator 44, consisting of an analog chaotic circuit 46 and an analog to digital converter 48. The analog chaotic circuit 46 may be a circuit used in one of the analog chaotic generators known in the art. The output 50 of the "exclusive OR" circuit 42 is connected to the transmission link 51, and is also the input of a digital to analog converter 52 whose analog output feeds the analog chaotic circuit 46 whose chaotic output is converted to digits by the analog to digital converter 48.

The baud rate and pulse characteristics of the digital output 50 to the transmission link 51 are configured to be compatible with the band pass characteristics of the transmission link 51 in a manner known in the art. The output 53 of the transmission link 51 is applied to a receiver that mirrors the characteristics of the transmitting device. The output 53 is applied to a digital to analog converter 55 whose analog output drives the analog chaotic circuit 54 of the combined analog to digital chaotic generator 56. The output of the combined analog\digital chaotic generator 56 is provided by the analog to digital converter 58 feeding one input of the "exclusive OR" circuit 60. The other input to the "exclusive OR" circuit 60 is the output 53. The output of the "exclusive OR" circuit 60 feeds a digital to analog converter 62 to recover the analog information at 64.

Figure 5:
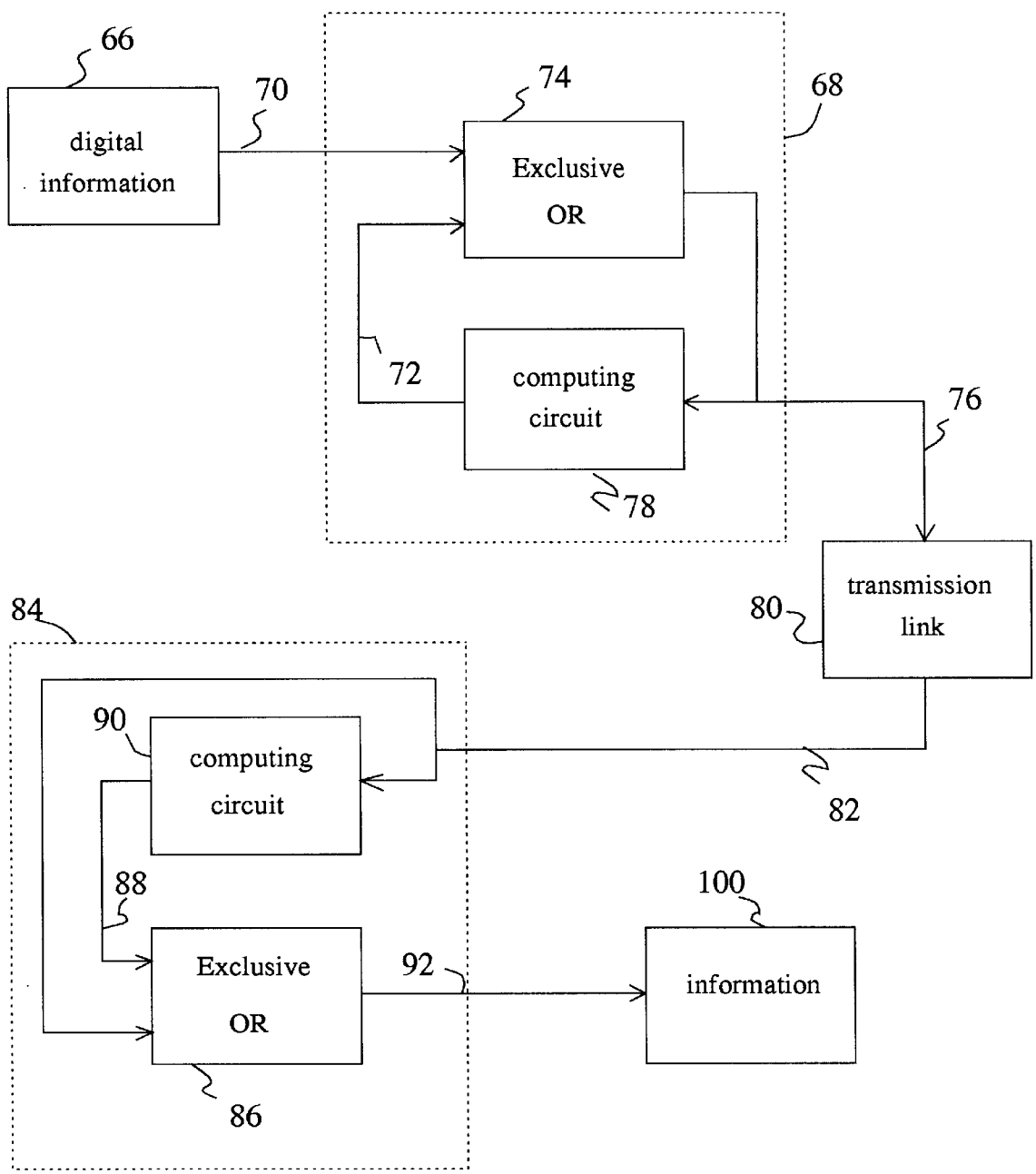
FIG. 5 is a block diagram of a digital embodiment of the invention.

Referring to FIG. 5, in a third embodiment digital information 66 is fed to a programmed digital computer 68. 4 bytes of 8 bits each, i.e. (32) bits, are input 70 into the digital computer 68 wherein the input 70 and an output 72 from a computing circuit 78 of the digital computer 68 are "mixed" in an "exclusive OR" operation 74 of the digital computer 68. The output 76 resulting from this mixing is input to the computing circuit 78. Computing circuit 78 converts the input 76, which is a 32 bit digital word, into a double precision numerical value 76'. Stored within the computing circuit 78, is a double precision multiplier "A", e.g. "A"= 7.568301, which is multiplied by the double precision multiplicand 76', to generate a double precision product 72'. This product 72' is converted in the computing circuit 78 to a 32 bit binary output 72, using the fractional value of 72' and dropping its 32 least significant bits. (In the drawings, different but related elements are identified by the same reference character, albeit that the different elements are distinguished by primes.) The output signal 72 is fedback as an input to the "exclusive OR" operation 74 where it is mixed with the next 32 bits of input information 66.

The output 76, derived from a chaotic map generated by the above described operations, contains and masks the input digital information 66. Besides being fed as input to the computing circuit 78, the output 76 drives the input of a transmission link 80, whose bandwidth is compatible with the baud rate and pulse characteristics of the digital signals, and whose output 82 is demodulated by a compatible programmed digital computer 84 to recover the encoded information 66.

The digital computer 84 is substantially identical to the digital computer 68. The output 82 of the transmission link 80 is fed to the digital computer 84 as 4 bytes of 8 bits each. The 32 bits are input to an "exclusive OR" circuit 86 whose other input is the 32 bits output 88 from the computing circuit 90. The output 82 is converted to a double precision value 82' in the computing circuit 90, and is multiplied by the same double precision multiplier "A" used in the modulation process. The fractional value of the resultant double precision product is converted into a 32 bit binary value which is the output 88 of the computing circuit 90. After auto-synchronization which takes about 3 words (100 bits), the output 92 is the decoded digital information 100.

The initial state of the receiver map is irrelevant as the map is synchronized automatically in a few iterations. The system is extremely sensitive to the difference in parameters of the transmitter and receiver chaotic maps, that is, the double precision products generated by means of multiplication by the stored multiplier "A". A difference of $10^{-7}$ makes the output practically unrecognizable (more than 95% errors); with the difference of $10^{-9}$ the error rate drops to about 30%. This makes the covert channel very hard to break without an a priori knowledge of the system type and its precise parameter settings.

The invention has been described in detail with particular reference to preferred embodiments thereof, but it will be understood that variations and modifications can be effected within the spirit and scope of the invention. In particular, many other mathematical operations other than multiplication by a double precision number and taking the fractional part thereof are known in the art to produce chaotic sequences, and can be used in computations as disclosed in the third embodiment.

What is claimed is:

1. Covert communication apparatus for transmission and reception of information signals over a given communication link of specified finite bandwidth, said apparatus comprising:

a) first nonlinear analog electronic circuit for generating an analog chaotic carrier, said first nonlinear analog electronic circuit having an input and an output, b) first mixer circuit having first and second inputs and an output, c) first linear bandpass filter having substantially said specified finite bandwidth, said first linear bandpass filter connected between said first mixer first input and said output of said nonlinear analog electronic circuit, said output of said first mixer connected to said nonlinear analog electronic circuit input, d) said first mixer second input further adapted to receive said information signals, e) means for modulating said chaotic carrier with said information signals by said first mixer output, to provide a modulated chaotic carrier, said modulated chaotic carrier being band limited by said first linear bandpass filter to conform to said specified bandwidth, f) means for receiving said modulated chaotic carrier comprising a second nonlinear analog electronic circuit having an input and an output, said second nonlinear analog electronic circuit being substantially identical in structure to said first nonlinear analog electronic circuit, said modulated carrier to be applied to said input of said second nonlinear analog electronic circuit, g) second mixer circuit having first and second inputs and an output, h) second linear bandpass filter having substantially the same structure as first linear bandpass filter and having substantially said specified finite bandwidth, said second linear bandpass filter connected between said second mixer second input and said output of said second nonlinear analog electronic circuit, wherein said output of said second mixer provides decoded information signals substantially identical to said information signals.

2. Covert communication apparatus for transmission and reception of chaotically modulated analog information by means of a communication link of given finite bandwidth, said apparatus comprising:

a) first analog to digital converter for converting said analog information into a first stream of digital data, b) first digital mixer having first and second inputs and an output, wherein said first stream of digital data is for connection to said first input of said first digital mixer means, said output of said first digital mixing means being a second stream of digital data, said second stream of digital data being so constructed and arranged to be conformable with said given finite bandwidth for transmission over said communication link, the output of said communication link being a third digital data stream, c) first digital to analog converter, wherein said second stream of digital data is also for input to said first digital to analog converter, said first analog to digital converter providing a substantially exact digital representation of said chaotically modulated analog information, d) first analog chaotic signal generator wherein the output of said first digital to analog converter is input for said first analog chaotic signal generator, e) second analog to digital converter wherein the output of said first analog chaotic signal generator is input to said second analog to digital converter, said second analog to digital converter having as output a fourth stream of digital data, said second analog to digital convertor for substantially digitizing the full analog spectral frequency output from said first chaotic signal generator, said fourth stream of digital data for connection to said second input of said first digital mixer, f) second digital to analog converter, wherein said third stream of digital data is the input to said second digital to analog converter, wherein the output of said second digital to analog converter includes in digital form the full analog frequency spectrum of said first chaotic signal generator, g) second analog chaotic signal generator wherein the output of said second digital to analog converter is input to said second analog chaotic signal generator, h) third analog to digital converter wherein the analog output of said second analog chaotic signal generator is input to said third analog to digital converter, said third analog to digital converter having as output a fifth stream of digital data, said third analog to digital convertor for substantially digitizing the full spectral output from said second chaotic signal generator, i) second digital mixer having first and second inputs and an output, wherein said fifth stream of digital data is for connection to said first input of said second digital mixer, and said third stream of digital data is for input to said second input of said second digital mixer, and j) third digital to analog converter wherein said output of said third digital to analog converter replicates said analog input information.

3. The apparatus of claim 2 wherein said first and said second digital mixer comprises a digital exclusive "OR" circuit.

4. The apparatus of claim 2 wherein said first and said second analog chaotic signal generators comprise substantially identical non-linear circuits.

5. Covert communication apparatus for transmission and reception of digital information over a communication link of given finite bandwidth, said apparatus comprising:

a) a first digital computer for generating chaotic digital data, said first digital computer comprising a first exclusive "OR" function, whereby said digital information is one input to said first exclusive "OR" function, b) said first digital computer further comprising a first digital computing circuit having as one input the result of said first digital computer means first exclusive "OR" function, c) said first digital computer further providing an output from said first digital computing circuit as a second input to said first exclusive "OR" function, wherein the digital output of said exclusive "OR" function is so constructed and arranged for transmission over said given finite bandwidth communication link, d) a second digital computer further comprising a second digital computing circuit having as one input the output of said communication link, e) said second digital computer further comprising a second exclusive "OR" function having the output of said second computing circuit and said output of said communication link as inputs, the output of said second exclusive "OR" function for replicating the digital information input, f) further wherein said first computing circuit converts the input to said first computing circuit to a first double precision number, multiplies said first double precision number with a second double precision number stored in said first computing circuit, selects a group of digits from the resultant product, and converts the result to a single precision number which is the output of said first computing circuit, and g) wherein said second computing circuit converts the input to said second computing circuit to a third double precision number, multiplies said third double precision number with a fourth precision number stored in said second computing circuit, said fourth precision number being equal to said second precision number, selects a group of digits from the resultant product and converts the result to a single precision number which is the output of said second computing circuit.

6. A method of transmitting and receiving covert information over a given limited bandwidth transmission link, said method comprising the steps of:

a) generating a first chaotic signal, b) providing a first linear bandpass filter as a feedback element in generating said first chaotic signal, b) mixing said information with said first chaotic signal to provide a mixed signal for transmission over said communication link, said mixed signal having a chaotic frequency spectrum substantially equal to or less than said given limited bandwidth, c) recovering said mixed signal from the output of said communication link to provide a recovered mixed signal, d) reproducing said first chaotic signal by means of a second chaotic signal generator having a second linear filter incorporated therein to provide a recovered chaotic signal, and e) mixing said recovered chaotic signal with said recovered mixed signal to reproduce said information.

* * * * *